United States Patent
Chung et al.

(10) Patent No.: US 8,232,343 B2
(45) Date of Patent: Jul. 31, 2012

(54) ENVIRONMENTALLY-FRIENDLY POLYLACTIC ACID RESIN COMPOSITION

(75) Inventors: Young-Mi Chung, Uiwang-si (KR);
Chang-Do Jung, Uiwang-si (KR);
Young-Jun Lee, Uiwang-si (KR);
Ji-Won Pack, Uiwang-si (KR);
Young-Chul Kwon, Uiwang-si (KR);
Hyung-Tak Lee, Uiwang-si (KR);
Jin-Kyung Cho, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 503 days.

(21) Appl. No.: 12/434,088

(22) Filed: May 1, 2009

(65) Prior Publication Data
US 2010/0056700 A1 Mar. 4, 2010

(30) Foreign Application Priority Data
Sep. 2, 2008 (KR) .................. 10-2008-0086359

(51) Int. Cl.
C08L 69/00 (2006.01)
C08G 63/06 (2006.01)
C08G 63/195 (2006.01)

(52) U.S. Cl. .............. 524/537; 525/450; 525/462

(58) Field of Classification Search .......... 524/537; 525/450, 462
See application file for complete search history.

(56) References Cited

U.S. PATENT DOCUMENTS

| | | | |
|---|---|---|---|
| 4,719,246 A * | 1/1988 | Murdoch et al. ............ 521/134 |
| 5,272,221 A | 12/1993 | Kitao et al. | |
| 5,847,011 A * | 12/1998 | Terado et al. ............... 521/48 |
| 7,863,382 B2 | 1/2011 | Ishii et al. | |
| 2008/0051508 A1 | 2/2008 | Hayata et al. | |
| 2009/0239433 A1* | 9/2009 | Kurihara et al. ............ 442/164 |
| 2010/0028657 A1* | 2/2010 | Ito et al. .................... 428/327 |
| 2010/0227963 A1 | 9/2010 | Hironaka et al. | |

FOREIGN PATENT DOCUMENTS

| | | |
|---|---|---|
| DE | 112005003395 T5 | 12/2007 |
| EP | 1792941 A1 | 6/2007 |
| EP | 1983030 A1 | 10/2008 |
| JP | 11-279380 | 10/1999 |
| JP | 2000-017164 | 1/2000 |
| JP | 2003-138119 | 5/2003 |
| JP | 2003-147180 | 5/2003 |
| JP | 2003-192884 | 7/2003 |
| JP | 2005-048067 | 2/2005 |
| JP | 2006-070224 | 3/2006 |
| JP | 2006-143772 | 6/2006 |
| JP | 2006-199743 | 8/2006 |
| JP | 2006-241607 | 9/2006 |
| JP | 2007-023083 | 2/2007 |
| JP | 2008-037996 | 2/2008 |
| JP | 2008037996 A * | 2/2008 |
| JP | 2008-063356 | 3/2008 |
| WO | WO 2007060930 A1 * | 5/2007 |
| WO | 2007/083820 A1 | 7/2007 |
| WO | WO 2008102536 A1 * | 8/2008 |

OTHER PUBLICATIONS

JP 2008037996 A, Feb. 2008, Machine translation.*
Ikada et al., Stereocomplex formation between enantiomeric poly(lactides), Macromolecules, 1987, 20, (4) pp. 904-906, ACS Publications, Washington, DC, downloaded from http://pubs.acs.org on Jan. 14, 2009.
Tsuji et al., Sterocomplex formation between enantiomeric poly(lactic acids). 9. Stereocomplexation from the melt, Macromolecules, 1993, 26 (25), pp. 6918-6926, ACS Puclications, Washington, DC, downloaded from http://pubs.acs.org on Jan. 14, 2009.

* cited by examiner

*Primary Examiner* — Satya Sastri
(74) *Attorney, Agent, or Firm* — Summa, Additon & Ashe, P.A.

(57) ABSTRACT

An environmentally-friendly polylactic acid resin composition includes (A) a mixed resin including (a1) a polylactic acid (PLA) resin and (a2) a polycarbonate resin, and (B) a compatibilizer capable of forming a stereo-complex with the polylactic acid resin. According to the present invention, the polylactic acid resin composition is environmentally-friendly and has excellent appearance and improved welding impact strength, as well as improved mechanical strength and heat resistance. Accordingly, it can be used for manufacturing various molded products requiring heat resistance and mechanical strength, for example electronic parts, office machines, miscellaneous goods, and the like.

11 Claims, No Drawings

ENVIRONMENTALLY-FRIENDLY POLYLACTIC ACID RESIN COMPOSITION

CROSS-REFERENCE TO RELATED APPLICATION

This application claims priority to and the benefit of Korean Patent Application No. 10-2008-0086359 filed in the Korean Intellectual Property Office on Sep. 2, 2008, the entire disclosure of which is incorporated herein by reference.

FIELD OF THE INVENTION

The present invention relates to an environmentally-friendly polylactic acid resin composition. More particularly, the present invention relates to an environmentally-friendly polylactic acid resin composition having excellent heat resistance and appearance and improved welding impact strength.

BACKGROUND OF THE INVENTION

There has been much research on the development of strong polymer materials for special purposes, and on the safety thereof. However, discarded polymer is now socially recognized as a severe environmental problem all over the world, leading to efforts to develop environmentally-friendly polymer materials.

Environmentally-friendly polymers can be mainly classified into photodegradable and biodegradable polymers. Biodegradable polymers have a functional group that can be decomposed by microorganisms.

Among these polymers, aliphatic polyester polymer has gained the most attention, since it has excellent porosity and an easily-adjustable decomposition characteristic. In particular, polylactic acid (PLA) has a market share of 150,000 tons in the world and expansively covers the field where common plastic is used, for example food packing materials and containers, cases for electronics, and the like. At present, polylactic acid resin is mainly used for disposable products such as food containers, wraps, films, and the like due to its biodegradable characteristics. Examples of polylactic acid resins include those manufactured by American NatureWorks LLC, Japanese Toyota Motors Inc., and the like.

However, since conventional polylactic acid resin lacks formability, mechanical strength, and heat resistance, a thin film made therefrom can be easily destroyed. Further, since it has low resistance against high temperature, a molded product made therefrom can also be distorted at 60° C. or higher.

In order to overcome these problems, polylactic acid resin has been blended with petroleum-based thermoplastic plastics, for example a polycarbonate resin, a polyamide resin, an acrylonitrile-butadiene-styrene (ABS) resin, a polyacetal resin, and the like.

Japanese Patent Laid-Open Publication No. 1999-279380 discloses a polylactic acid resin and an acrylonitrile styrene resin composition, and Japanese Patent Laid-Open Publication No. 2006-70224 discloses a polylactic acid resin and an acrylonitrile-butadiene-styrene resin composition to improve heat resistance. Japanese Patent Laid-Open Publication No. 2006-143772 and U.S. Pat. No. 5,272,221 disclose a method of enhancing biomass by using a polylactic acid-polyamide resin composition. In addition, Japanese Patent Laid-Open Publication No. 2003-147180 and No. 2003-138119 disclose a method of increasing heat resistance by using a polyoxymethylene-polylactic acid resin composition.

Japanese Patent Laid-Open Publication No. 2005-048067 and No. 2006-199743 disclose a method of improving heat resistance by using a polylactic acid-polycarbonate resin composition. However, since the polylactic acid resin and polycarbonate resin have low compatibility, there is limited improvement in properties, and the blend has the problem of a flow mark or welding line degrading the appearance of products.

Macromolecules 20, 904 (1987) and 26, 6918 (1993) disclose crystalline improvement by fusing L-isomeric polylactic acid and D-isomeric polylactic acid. Furthermore, Japanese Patent Laid-Open Publication No. 2007-023083 and No. 2006-241607 disclose inducement of high crystallinity and improvement of thermal stability and mechanical strength by using a stereo-complex polylactic acid.

SUMMARY OF THE INVENTION

An exemplary embodiment of the present invention provides an environmentally-friendly polylactic acid resin composition having excellent heat resistance and appearance, and improved welding impact strength.

Another embodiment of the present invention provides an environmentally-friendly polylactic acid resin composition, which is suitable for various molded products requiring heat resistance and mechanical strength, for example vehicles, machine parts, electronic parts, office machines, miscellaneous goods, and the like.

The embodiments of the present invention are not limited to the above technical purposes, and a person of ordinary skill in the art can understand other technical purposes.

According to one embodiment of the present invention, an environmentally-friendly polylactic acid resin composition is provided that includes (A) a mixed resin including (a1) a polylactic acid (PLA) resin and (a2) a polycarbonate resin, and (B) a compatibilizer capable of forming a stereo-complex with the polylactic acid resin.

The compatibilizer may be a copolymer of a polylactic acid resin that is an optical isomer of the polylactic acid resin (a1) of the mixed resin (A) and polycarbonate. As an example, when the polylactic acid resin of the mixed resin primarily comprises an L-isomer, the compatibilizer can include a D-isomeric polylactic acid. As another example, when the polylactic acid resin of the mixed resin primarily comprises a D-isomer, the compatibilizer can include an L-isomeric polylactic acid. The combination of an L-isomeric polylactic acid as the polylactic acid resin (a1) of the mixed resin (A) and a D-isomeric polylactic acid of the compatibilizer according to one embodiment can have economic benefits.

According to another embodiment of the present invention, a molded product made from the environmentally-friendly polylactic acid resin composition is provided.

Hereinafter, further embodiments of the present invention will be described in detail.

The environmentally-friendly polylactic acid resin composition of the present invention has excellent appearance and improved mechanical strength and heat resistance as well as welding impact strength, and can accordingly be used to manufacture various molded products requiring heat resistance and mechanical strength, for example, vehicles, machine parts, electronic parts, miscellaneous machines, and the like.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, the term "(meth)acrylonitrile" refers to acrylonitrile or methacrylonitrile and the term "(meth)acrylate" refers to acrylate or methacrylate.

One embodiment of the present invention is drawn to an environmentally-friendly polylactic acid resin composition having improved compatibility between a polylactic acid resin and a polycarbonate resin by using a compatibilizer.

The environmentally-friendly polylactic acid resin composition according to one embodiment of the present invention includes (A) a mixed resin including (a1) a polylactic acid (PLA) resin and (a2) a polycarbonate resin, and (B) a compatibilizer capable of forming a stereo-complex with the polylactic acid resin.

Exemplary components included in the environmentally-friendly polylactic acid resin composition according to embodiments of the present invention will hereinafter be described in detail. However, these embodiments are only exemplary, and the present invention is not limited thereto.

(A) Mixed Resin (a1) Polylactic Acid (PLA) Resin

In general, a polylactic acid resin is a commercially-available polyester-based resin made using lactic acid acquired by decomposing corn starch as a monomer.

The polylactic acid resin can include an L-isomeric lactic acid, a D-isomeric lactic acid, or an L,D-isomeric lactic acid. The isomers can be used singularly or in combination. The polylactic acid resin may include an L-isomer in an amount of about 95 wt % or more to provide a balance of heat resistance, formability, and economic efficiency. For example, the polylactic acid resin may include the L-isomer in an amount of about 95 to about 100 wt % and the D-isomer in an amount of about 0 to about 5 wt %, taking into consideration hydrolysis resistance.

There is no particular limitation on the molecular weight or molecular weight distribution of the polylactic acid resin as long as it can be molded. However, a polylactic acid resin with a weight average molecular weight of more than about 80,000 can provide a molded product with balanced mechanical strength and heat resistance. In another embodiment, the polylactic acid resin may have a weight average molecular weight ranging from about 90,000 to about 500,000.

According to one embodiment of the present invention, the polylactic acid resin may be present in the mixed resin of the environmentally-friendly polylactic acid resin composition in an amount of about 25 to about 80 wt %, based on the total weight of the mixed resin. In another embodiment, the mixed resin can include polylactic acid resin in an amount of about 40 to about 80 wt %, based on the total weight of the mixed resin. When the polylactic acid resin is included within this range, it may contribute to the balance between formability and heat resistance.

(a2) Polycarbonate Resin

The polycarbonate resin may be prepared by reacting one or more diphenols of the following Chemical Formula 1 with phosgene, halogen formate, carbonate, or a combination thereof.

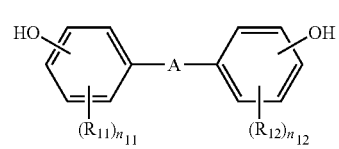

[Chemical Formula 1]

In the above Chemical Formula 1, A is a single bond, substituted or unsubstituted C1 to C5 alkylene, substituted or unsubstituted C1 to C5 alkylidene, substituted or unsubstituted C3 to C6 cycloalkylene, substituted or unsubstituted C5 to C6 cycloalkylidene, CO, S, or $SO_2$, $R_{11}$ and $R_{12}$ are each independently substituted or unsubstituted C1 to C30 alkyl or substituted or unsubstituted C6 to C30 aryl, and $n_{11}$ and $n_{12}$ are each independently integers ranging from 0 to 4.

As used herein, when a specific definition is not otherwise provided, the term "substituted" refers to one substituted with at least a substituent selected from halogen, C1 to C30 alkyl, C1 to C30 haloalkyl, C6 to C30 aryl, C1 to C20 alkoxy, or a combination thereof.

The diphenols represented by the above Chemical Formula 1 may be used in combinations to constitute repeating units of the polycarbonate resin. Exemplary diphenols useful in the present invention include without limitation hydroquinone, resorcinol, 4,4'-dihydroxydiphenyl, 2,2-bis (4-hydroxyphenyl)-propane, 2,4-bis(4-hydroxyphenyl)-2-methylbutane, 1,1-bis (4-hydroxyphenyl)-cyclohexane, 2,2-bis(3-chloro-4-hydroxyphenyl)-propane, 2,2-bis(3,5-dichloro-4-hydroxyphenyl)-propane, and the like, and combinations thereof.

In one embodiment, the polycarbonate resin can have a weight average molecular weight ranging from about 10,000 to about 200,000, and in another embodiment, the polycarbonate resin can have a weight average molecular weight ranging from about 15,000 to about 80,000, but the present invention is not limited thereto.

The polycarbonate resin may include mixtures of polycarbonate resins obtained using two or more diphenols that are different from each other. The polycarbonate resin may include a linear polycarbonate resin, a branched polycarbonate resin, a polyester carbonate copolymer, and the like, as well as a combination thereof.

The linear polycarbonate resin may include a bisphenol-A based polycarbonate resin. The branched polycarbonate resin may include one produced by reacting a multi-functional aromatic compound such as trimellitic anhydride, trimellitic acid, and the like with diphenols and carbonate. The multi-functional aromatic compound may be included in an amount of about 0.05 to about 2 mol % based on the total amount of the branched polycarbonate resin. The polyester carbonate copolymer resin may include one produced by reacting a difunctional carboxylic acid with diphenols and carbonate. The carbonate may include a diaryl carbonate such as diphenyl carbonate, and ethylene carbonate.

The mixed resin of the environmentally-friendly polylactic acid resin composition of the invention can include the polycarbonate resin in an amount of about 20 to about 75 wt %, based on the total weight of the mixed resin. In another embodiment, the mixed resin can include the polycarbonate resin in an amount of about 20 to about 60 wt %, based on the total weight of the mixed resin. When the polycarbonate resin is included within this range, it can maintain appropriate biomass and provide a balance between formability and heat resistance.

(B) Compatibilizer

In the present invention, the compatibilizer may be a copolymer including a polylactic acid that can form a stereo-complex with the polylactic acid resin (a1) of the mixed resin (A). In exemplary embodiments, the compatibilizer can include a copolymer of a polylactic acid resin that is an optical isomer of the polylactic acid resin (a1) of the mixed resin (A) and polycarbonate.

As an example, when the polylactic acid resin (a1) of the mixed resin (A) is an L-isomer, the polylactic acid of the compatibilizer is a D-isomer. As another example, when the polylactic acid resin (a1) of the mixed resin (A) is a D-isomer, the polylactic acid of the compatibilizer is an L-isomer. A copolymer of the D-isomer of polylactic acid and polycarbonate can provide certain economic advantages.

Since polylactic acid resin (a1) of the mixed resin (A) and polycarbonate resin have poor compatibility with each other, they may easily leave a flow mark on the surface of extruded products and a severe welding line, deteriorating welding impact strength.

Without being bound by any theory or explanation of the present invention, is currently believed that because the compatibilizer can include polylactic acid resin which is an optical isomer of the polylactic acid (a1) of the mixed resin (A) (for example, a D-isomer and an L-isomer, respectively), it can form a polylactic acid stereo-complex at the interface of the polylactic acid resin and the polycarbonate resin and as a resultant can maximize crystallinity of the polylactic acid at the interface and compatibility between the resins.

The D-isomer and L-isomer of polylactic acid of the compatibilizer can be the same as those aforementioned with regard to the polylactic acid (a1) of the mixed resin (A). The polycarbonate of the compatibilizer also may include any polycarbonate resin used in the mixed resin (A), and is not further explained in detail. However, the polycarbonate resin of the compatibilizer may have a lower weight average molecular weight than the polycarbonate resin of the mixed resin (A). For example, the polycarbonate of the compatibilizer may have a weight average molecular weight ranging from about 1000 to about 100,000.

Furthermore, the polylactic acid of the compatibilizer, for example a D-isomer of polylactic acid, may have a weight average molecular weight (Mw) ranging from about 1000 to about 200,000. When the compatibilizer has an appropriate molecular weight, it can be effectively disposed at the interface of the two polymers of the mixed resin (namely, the polylactic acid resin and the polycarbonate resin of the mixed resin) and have a good effect on the compatibility of the polymers of the mixed resin. When the polylactic acid of the compatibilizer has a lower molecular weight, it may have low miscibility and reactivity with each polymer. On the other hand, when the polylactic acid of the compatibilizer has a higher molecular weight, it may have deteriorated fluidity and thereby may not move onto the interface of the two polymers, or may be phase-separated.

In addition, when a copolymer includes an optical isomer of the polylactic acid (a1) of the mixed resin (A), for example D-polylactic acid, and polycarbonate in a weight ratio of about 5:95 to about 95:5, the copolymer can have a good influence on the balance of properties of the resin composition, including welding impact strength, heat resistance, and appearance. In another embodiment, the copolymer may include the optical isomer of the polylactic acid of the mixed resin and polycarbonate in a weight ratio of about 30:70 to about 70:30.

According to exemplary embodiments of the present invention, the compatibilizer may be a polylactic acid-polycarbonate copolymer including polylactic acid with a weight average molecular weight (Mw) ranging from about 1000 to about 200,000 formed by ring-opening polymerization of a D,D-lactide monomer and using bisphenol-A polycarbonate with a weight average molecular weight (Mw) ranging from about 1000 to about 100,000 as an initiator.

The environmentally-friendly polylactic acid resin composition of the present invention may include the compatibilizer in an amount of about 0.01 to about 30 parts by weight, based on 100 parts by weight of the mixed resin (A). In another embodiment, the polylactic resin composition of the invention may include the compatibilizer in an amount of about 2 to about 10 parts by weight, based on 100 parts by weight of the mixed resin (A). When the compatibilizer is used within these ranges, it can improve the balance of properties including heat resistance, appearance, and welding line.

(C) Impact Modifier

The environmentally-friendly polylactic acid resin composition of the present invention can optionally include an impact modifier to improve impact strength.

The impact modifier can improve affinity with the polylactic acid resin, and can be a core-shell type copolymer, a chain-shaped modifier, or a combination thereof.

The core-shell type copolymer has a core-shell structure wherein unsaturated monomers are grafted onto a rubber core to form a hard shell. Exemplary unsaturated monomers of the core-shell type copolymer include without limitation styrene, alkyl- or halogen-substituted styrene, (meth)acrylonitrile, acrylonitrile, methacrylic acid alkyl esters, acrylic acid alkyl esters, anhydrides, alkyl- or phenyl-N-substituted maleimides, and the like, and combinations thereof.

Exemplary rubber cores of the core-shell type copolymer include without limitation rubber polymers obtained by polymerizing a diene-based rubber monomer, an acrylate-based rubber monomer, or a silicone-based rubber monomer. For example, the rubber may be prepared by polymerizing one or more rubber monomers selected from diene-based rubbers with 4 to 6 carbons, acrylate-based rubbers, or silicone-based rubbers.

Exemplary diene-based rubbers useful in the present invention include without limitation butadiene rubbers, acryl rubbers, ethylene/propylene rubbers, styrene/butadiene rubbers, acrylonitrile/butadiene rubbers, isoprene rubbers, ethylene-propylene-diene (EPDM) terpolymers, and the like, and combinations thereof.

Exemplary acrylate-based rubbers useful in the present invention include without limitation acrylate monomers such as methylacrylate, ethylacrylate, n-propylacrylate, n-butylacrylate, 2-ethylhexylacrylate, hexylmethacrylate, or 2-ethylhexyl(meth)acrylate, and the like and combinations thereof. Curing agents such as ethylene glycol di(meth)acrylate, propylene glycol di(meth)acrylate, 1,3-butylene glycol di(meth)acrylate or 1,4-butylene glycol di(meth)acrylate, allyl(meth)acrylate, triallylcyanurate, and the like may be used along with the acrylate monomers.

Exemplary silicone-based rubbers useful in the present invention can be obtained from cyclosiloxane. Examples of cyclosiloxane include without limitation dimethylsiloxane, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. These cyclosiloxanes may be used for preparation of the silicone-based rubber. Curing agents such as trimethoxymethylsilane, triethoxyphenylsilane, tetramethoxysilane, tetraethoxysilane, and the like may be used along with the cyclosiloxanes.

In one embodiment, the silicone-based rubber or a mixture of the silicone-based rubber and acrylate-based rubber may be used to improve structural stability of the silicone-based rubber. The rubber can have an average particle diameter ranging from about 0.4 to about 1 µm to balance impact resistance and coloring properties.

In addition, the unsaturated monomer that can be grafted onto a rubber may include more than one unsaturated compound selected from styrene, alkyl or halogen substituted styrene, (meth)acrylonitrile, acrylonitrile, methacrylic acid alkyl esters, acrylic acid alkyl esters, anhydrides, and alkyl- or phenyl-N-substituted maleimides, and the like and combinations thereof.

Exemplary methacrylic acid alkyl esters and acrylic acid alkyl esters include alkyl esters of acrylic acid or methacrylic acid. For example, a $C_1$ to $C_8$ alkyl ester that is obtained from a reaction of acrylic acid or methacrylic acid and $C_1$ to $C_8$ monohydryl alcohols may be used. Specific examples include methacrylic acid methyl ester, methacrylic acid ethyl ester, methacrylic acid propyl ester, and the like, and combinations thereof.

The anhydride includes acid anhydride. More specifically, the anhydride may be a carboxylic acid anhydride such as maleic anhydride, itaconic anhydride, and the like, and combinations thereof.

In the core-shell type copolymer, the core material of rubber and an unsaturated monomer for grafting are mixed in a weight ratio ranging from about 50 to 90:5 to 30. When the core-shell type copolymer includes the core material of rubber and an unsaturated monomer for grafting within this range, it can have excellent compatibility with a resin. As a result, it can have excellent impact reinforcement effects.

Other exemplary impact modifiers useful in the present invention can include a chain-type ester-based or olefin-based copolymer such as a thermoplastic polyester or polyolefin-based main chain polymer to which an epoxy or anhydride functional group is grafted.

Exemplary olefin-based copolymer impact modifiers can be prepared from one or more olefin-based monomers such as ethylene, propylene, isopropylene, butylene, isobutylene, and the like and combinations thereof. The olefin-based copolymer can be prepared by using a Ziegler-Natta catalyst, which is an olefin polymerization catalyst, or a methallocene-based catalyst for a more selective structure. In addition, a functional group such as anhydrous maleic acid, glycidyl methacrylate, oxazoline, and the like can be grafted onto an olefin-based copolymer in order to improve dispersion.

The method of grafting the functional group into an olefin-based copolymer can be easily understood by those of ordinary skill in the art.

The impact modifier may be included in an amount of about 0.01 to about 20 parts by weight, based on 100 parts by weight of a mixed resin including (A) (a1) a polylactic acid resin (such as an L-isomeric polylactic acid resin) and (a2) a polycarbonate resin. When the impact modifier is included within this range, it can contribute impact reinforcing effects and improve mechanical strength such as tensile strength, flexural strength, flexural modulus, and the like.

(D) Other Additives

According to various embodiments of the present invention, the environmentally-friendly polylactic acid resin composition may further include an additive such as an antioxidant, a weather-resistance agent, a release agent, a colorant, an ultraviolet (UV) blocker, a filler, a nucleus-forming agent, a plasticizer, an auxiliary agent for adhesion, an adhesive, or a combination thereof, unless the additive(s) interferes with the purpose of the present invention.

Exemplary antioxidants may include without limitation phenol, phosphide, thioether, and amine antioxidants, and the like, and combinations thereof. Exemplary weather-resistant agents may include without limitation benzophenones, amines, and the like, and combinations thereof.

Exemplary release agents may include without limitation fluorinated polymers, silicone oils, metal stearates, metal montanates, montanic acid ester waxes, polyethylene waxes, and the like, and combinations thereof. Exemplary colorants may include without limitation, dyes, pigments, and combinations thereof.

Exemplary ultraviolet (UV) blockers may include without limitation titanium oxide, carbon black, and the like, and combinations thereof. Exemplary fillers may include without limitation silica, clay, calcium carbonate, calcium sulfate, glass beads, and the like, and combinations thereof. Exemplary nucleus-forming agents may include without limitation talc, clay, and the like, and combinations thereof.

The environmentally-friendly polylactic acid resin composition can be prepared using any conventional method known in the art for preparing a resin composition. For example, it can be formed into pellets by simultaneously mixing the components and other additives and fusing and extruding them. In the extruding process, the polylactic acid of the mixed resin and the compatibilizer can form a stereo-complex.

The environmentally-friendly polylactic acid resin composition can be used to mold various products, including products requiring both excellent heat resistance and mechanical strength. For example, it can be molded into vehicle parts, machine parts, electronic parts, parts for office machines such as computers, miscellaneous goods, and the like. The composition of the invention can, for example, be used for housings for electronics such as a television, a computer, a printer, a washing machine, a cassette player, audio equipment, a mobile phone, and the like.

According to another embodiment of the present invention, provided is a product molded from the environmentally-friendly polylactic acid resin composition.

Hereinafter, the present invention is illustrated in more detail with reference to examples. However, they are exemplary embodiments of the present invention and are not limiting.

EXAMPLES

According to examples and comparative examples, (A) (a1) an L-isomer of a polylactic acid resin and (a2) a polycarbonate resin, (B) a compatibilizer, and (C) an impact modifier are as follows.

(A) Mixed Resin (a1) L-isomer of a polylactic acid (PLA) resin 4032D including 97.5 wt % of an L-isomer, which is made by USA NatureWorks LLC, is used.

(a2) Polycarbonate Resin

A PANLITE L-1250WP resin made by Japanese Teijin Ltd. is used.

(B) Compatibilizer

A compatibilizer is prepared in the following process.

(b1) PC-PDLA-1: Bisphenol-A is mixed with diphenyl carbonate in a weight ratio of 1.04:1. The mixture is reacted with $10^{-7}$ to $10^{-6}$ mol % catalyst (potassium hydroxide, KOH) in a batch-type reactor. The reaction temperature is gradually raised from 180° C. to 300° C. according to a viscosity increase of the reaction medium. In addition, a reflux column and a vacuum pump are connected to the reactor to remove a reaction product, phenol, under 1 torr or less of vacuum. The phenol only is removed by returning diphenyl carbonate that is volatilized therewith to the reactor. The reaction is performed for about 8 to 12 hours. Accordingly, bisphenol A-polycarbonate with a weight average molecular weight (Mw) of 5000 is synthesized depending on reaction time and vacuum degree.

Then, the bisphenol A-polycarbonate is used as an initiator to prepare a polylactic acid-polycarbonate copolymer, in which the polylactic acid has a weight average molecular weight (Mw) of 10,000, by ring-opening polymerization of a D,D-lactide monomer imported from Purac Co. as follows.

The ring-opening polymerization is performed at 190° C. for 1 to 2 hours by adding 200 g of D,D-lactide to a batch-type mixer purged with nitrogen, and then adding 100 to 200 g of the low molecular weight polycarbonate as an initiator and 12 mg of tin octylate as a catalyst. Then, the compatibilizer is vacuum-dried at 100° C. to remove unreacted monomer.

(b2) PC-PDLA-2: a polylactic acid-polycarbonate copolymer including polylactic acid with a weight average molecular weight (Mw) of 30,000 is prepared by using bisphenol-A polycarbonate with a weight average molecular weight (Mw) of 10,000 as an initiator to ring-opening polymerize the D-isomer polylactide. The compatibilizer is polymerized in the same method as the PC-PDLA-1, except with regard to its molecular weight.

(b3) PC-PDLA-3: a polylactic acid-polycarbonate copolymer including polylactic acid with a weight average molecular weight (Mw) of 60,000 is prepared by using bisphenol-A polycarbonate with a weight average molecular weight (Mw) of 15,000 as an initiator to ring-opening polymerize the D-isomer polylactide. The compatibilizer is polymerized in the same method as the PC-PDLA-1, except with regard to its molecular weight.

(C) Impact Modifier

METABLENE S-2001 of MRC (core-shell type MBS: methyl methacrylate-butyl acrylate and dimethyl siloxane copolymer) is used as an impact modifier.

(D) SAN-GMA Compatibilizer

Styrene, acrylonitrile, and glycidyl methacrylate (GMA) in a weight ratio of 70.6:28.9:0.5 is prepared to form a compound using a conventional method. The compound is prepared by grafting GMA into a styrene/acrylonitrile copolymer.

Example 1

50 wt % of a polylactic acid (PLA) resin and 50 wt % of a polycarbonate resin are mixed together. Then, 2 parts by weight of a PC-PDLA-1 compatibilizer is added to 100 parts by weight of the mixed resin to prepare an environmentally-friendly polylactic acid resin composition.

The polylactic acid resin composition is extruded at a temperature ranging from 200 to 230° C. with a common screw extruder. The extruded product is shaped into pellets.

The pellets are dried at 80° C. for 4 hours and then prepared as an ASTM dumbbell specimen by using an 6 oz injection molding machine capable of injecting and molding set at a cylinder temperature of 230° C., a molding temperature of 80° C., and a molding cycle of 60 seconds.

Example 2

A polylactic acid resin composition is prepared according to the same method as Example 1, except for using 5 parts by weight of the compatibilizer based on 100 parts by weight of a mixed resin.

Example 3

A polylactic acid resin composition is prepared according to the same method as Example 2, except for using PC-PDLA-2 instead of PC-PDLA-1 as a compatibilizer.

Example 4

A polylactic acid resin composition is prepared according to the same method as Example 2, except for using PC-PDLA-3 instead of PC-PDLA-1 as a compatibilizer.

Example 5

A polylactic acid resin composition is prepared according to the same method as Example 2, except for adding 5 parts by weight of an impact modifier.

Example 6

A polylactic acid resin composition is prepared according to the same method as Example 2, except for changing the ratio of polylactic acid resin and polycarbonate resin to 4:6.

Comparative Example 1

A polylactic acid resin composition is prepared according to the same method as Example 1, except for using no compatibilizer.

Comparative Example 2

A polylactic acid resin composition is prepared according to the same method as Example 1, except for using 5 parts by weight of an impact modifier but no compatibilizer.

Comparative Example 3

A polylactic acid resin composition is prepared according to the same method as Example 1, except for adding 2 parts by weight of a common compatibilizer SAN-GMA compatibilizer.

Reference Example 1

A polylactic acid resin composition is prepared according to the same method as Example 1, except for increasing the amount of compatibilizer to 35 parts by weight.

The properties of the specimens of Examples 1 to 6, Comparative Examples 1 and 2, and Reference Example 1 are evaluated using the following methods. The results are provided in the following Tables 1 and 2.

(1) Mechanical properties: measured based on ASTM D 638 and D 790.

(2) Thermal distortion temperature (HDT): measured based on ASTM D 648.

(3) Notched IZOD: measured based on ASTM D 256.

(4) Appearance: judged overall by observing the surface of a 2 mm-thick pin-point specimen (50 mm×200 mm) (○:excellent surface appearance without flow marks, :generally good appearance except for bad appearance only at the gate, X: flow marks on overall surface of a specimen).

(5) Welding impact strength: impact strength specimen of mold gate 2 was measured based on ASTM D 256 without notch.

TABLE 1

|  |  | unit | \multicolumn{6}{c}{Examples} |
| --- | --- | --- | --- | --- | --- | --- | --- | --- |
|  |  |  | 1 | 2 | 3 | 4 | 5 | 6 |
| (A) Mixed resin 100 parts by weight | (a1) polylactic acid resin | wt % | 50 | 50 | 50 | 50 | 50 | 40 |
|  | (a2) polycarbonate resin | wt % | 50 | 50 | 50 | 50 | 50 | 60 |
| (B) Compatibilizer | (b1) PC-PDLA-1 | parts by weight | 2 | 5 | — | — | 5 | 5 |
|  | (b2) PC-PDLA-2 | parts by weight | — | — | 5 | — | — | — |
|  | (b3) PC-PDLA-3 | parts by weight | — | — | — | 5 | — | — |
| (C) Impact modifier |  | parts by weight | — | — | — | — | 5 | — |
| Tensile strength |  | kgf/cm$^2$ | 600 | 620 | 550 | 580 | 550 | 640 |
| Flexural modulus |  | kgf/cm$^2$ | 27,000 | 28,000 | 24,000 | 27,000 | 24,000 | 31,000 |
| Thermal distortion temperature |  | °C. | 72 | 90 | 85 | 82 | 75 | 89 |
| Impact strength |  | kgf · cm/cm | 23 | 30 | 25 | 20 | 75 | 36 |
| Welding impact strength |  | kgf · cm/cm | 12 | 17 | 16 | 17 | 33 | 18 |
| Appearance |  | Naked eye | ○ | ○ | ○ | ○ | ○ | ○ |

TABLE 2

|  |  | unit | Comp. Ex. 1 | Comp. Ex. 2 | Comp. Ex. 3 | Ref. Ex. 1 |
| --- | --- | --- | --- | --- | --- | --- |
| (A) Mixed resin 100 parts by weight | (a1) polylactic acid resin | wt % | 50 | 50 | 50 | 50 |
|  | (a2) polycarbonate resin | wt % | 50 | 50 | 50 | 50 |
| (B) Compatibilizer (b1) PC-PDLA-1 |  | parts by weight | — | — | — | 35 |
| (C) Impact modifier |  | parts by weight | — | 5 | — | — |
| (D) SAN-GMA compatibilizer |  | parts by weight | — | — | 2 | — |
| Tensile strength |  | kgf/cm$^2$ | 520 | 620 | 590 | 450 |
| Flexural modulus |  | kgf/cm$^2$ | 21,000 | 28,000 | 26,000 | 18,000 |
| Thermal distortion temperature |  | °C. | 63 | 58 | 64 | 56 |
| Impact strength |  | kgf · cm/cm | 19 | 35 | 21 | 12 |
| Welding impact strength |  | kgf · cm/cm | 9 | 17 | 10 | 8 |
| Appearance |  | Naked eye | X | X | X |  |

As shown in Tables 1 and 2, the specimens of Examples 1 to 2 had improved heat resistance, impact strength, and welding impact strength, and also excellent appearance. In contrast, the specimen of Comparative Example 1 including no compatibilizer had sharply deteriorated impact strength, welding impact strength, and heat resistance, and also had a poor appearance.

In addition, comparing the specimens of Example 5 and Comparative Example 2, the specimen of Example 5 including an impact modifier and a compatibilizer has significantly improved appearance, heat resistance, impact strength, welding impact strength, and the like.

As shown in Table 1, when the amount of compatibilizer is increased (comparing Example 1 with Example 2), the specimen has generally improved properties. The L-isomeric polylactic acid resin of the mixed resin and the D-isomeric polylactic acid segment of the compatibilizer appear to act as a crystallizing agent, resultanting in improved crystallinity.

Comparing the specimens of Examples 2, 3, and 4, the molecular weight of each segment in the compatibilizer is important. A copolymer of the D-isomeric polylactic acid resin with a weight average molecular weight ranging from about 1000 to about 200,000 and the polycarbonate with a weight average molecular weight ranging from about 1000 to about 100,000 effectively works as a compatibilizer.

The specimen of Example 6 includes more polycarbonate and exhibits improved mechanical properties as compared to Example 2, as shown in Table 1. The reason is that polycarbonate has better properties than polylactic acid. Accordingly, the compatibilizer can work regardless of the composition ratio.

As shown in Table 2, the specimen of Comparative Example 3 including a conventional compatibilizer has sharply deteriorated heat resistance and other mechanical strengths and has a particularly poor appearance compared with the specimen including the compatibilizer of Example 1 of the present invention. In other words, a specimen including a common compatibilizer does not induce crystallinity, and thereby good properties and appearance, as compared to the specimens including the compatibilizer of the present invention.

Referring to Reference Example 1 of Table 2, when the specimen includes a compatibilizer at a high amount, it did not have good mechanical strength, welding impact strength, or appearance. The reason is that, when the compatibilizer is included beyond an adherence improvement point among the media, the excessive amount may deteriorate properties due to low molecular weight and cause surface appearance problems with stains.

Referring to the results of Tables 1 and 2, the compatibilizer has high affinity between the L-isomeric polylactic acid of the mixed resin and the D-isomeric polylactic acid therein, and therefore provides excellent compatibility therebetween, resultanting in improved impact strength, heat resistance, appearance, and the like.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An environmentally-friendly polylactic acid resin composition comprising:
   (A) a mixed resin comprising (a1) about 25 to about 80 wt % of a polylactic acid (PLA) resin and (a2) about 20 to about 75 wt % of a polycarbonate resin; and
   (B) a compatibilizer capable of forming a stereo-complex with the polylactic acid (PLA) resin, wherein the compatibilizer is a copolymer of a polylactic acid resin that is an optical isomer of the polylactic acid resin (a1) of the mixed resin (A) and polycarbonate, wherein the compatibilizer is included in an amount of about 2 to about 10 parts by weight based on 100 parts by weight of the mixed resin.

2. The environmentally-friendly polylactic acid resin composition of claim 1, wherein the polylactic acid resin (a1) of the mixed resin (A) is an L-isomer and the compatibilizer comprises a copolymer of a D-isomeric polylactic acid resin and polycarbonate.

3. The environmentally-friendly polylactic acid resin composition of claim 1, wherein the polylactic acid resin (a1) of the mixed resin (A) is a D-isomer and the compatibilizer comprises a copolymer of an L-isomeric polylactic acid resin and polycarbonate.

4. The environmentally-friendly polylactic acid resin composition of claim 1, wherein the polylactic acid resin (a1) of the mixed resin (A) has a weight average molecular weight (Mw) of about 90,000 to about 500,000, and the polycarbonate resin (a2) of the mixed resin (A) has a weight average molecular weight (Mw) of about 10,000 to about 200,000.

5. The environmentally-friendly polylactic acid resin composition of claim 2, wherein the D-isomeric polylactic acid resin of the compatibilizer has a weight average molecular weight (Mw) of about 1000 to about 200,000, and the polycarbonate resin of the compatibilizer has a weight average molecular weight (Mw) of about 1000 to about 100,000.

6. The environmentally-friendly polylactic acid resin composition of claim 1, wherein the polycarbonate resin comprises a linear polycarbonate resin, a branched polycarbonate resin, a polyester carbonate copolymer, or a mixture thereof.

7. The environmentally-friendly polylactic acid resin composition of claim 1, wherein the environmentally-friendly polylactic acid resin composition further comprises an impact modifier.

8. The environmentally-friendly polylactic acid resin composition of claim 7, comprising the impact modifier in an amount of about 0.01 to about 20 parts by weight based on 100 parts by weight of the mixed resin.

9. The environmentally-friendly polylactic acid resin composition of claim 7, wherein the impact modifier is a core-shell type copolymer, a chain-shaped modifier, or a combination thereof.

10. The environmentally-friendly polylactic acid resin composition of claim 1, wherein the environmentally-friendly polylactic acid resin composition further comprises an antioxidant, a weather-resistance agent, a release agent, a colorant, an ultraviolet (UV) blocker, a filler, a nucleus-forming agent, a plasticizer, an auxiliary agent for adhesion, an adhesive, or a mixture thereof.

11. A molded product made using the environmentally-friendly polylactic acid resin composition of claim 1.

* * * * *